March 23, 1937.  C. E. JONES  2,074,914
AEROPLANE CONTROL MECHANISM
Filed Dec. 17, 1935  5 Sheets-Sheet 1

Inventor
Carl E. Jones

March 23, 1937.　　C. E. JONES　　2,074,914
AEROPLANE CONTROL MECHANISM
Filed Dec. 17, 1935　　5 Sheets-Sheet 2

Inventor
Carl E. Jones
By Clarence A. O'Brien
Attorney

March 23, 1937.  C. E. JONES  2,074,914
AEROPLANE CONTROL MECHANISM
Filed Dec. 17, 1935  5 Sheets-Sheet 3

Inventor
Carl E. Jones
By Clarence A. O'Brien
Attorney

March 23, 1937. C. E. JONES 2,074,914
AEROPLANE CONTROL MECHANISM
Filed Dec. 17, 1935   5 Sheets-Sheet 4
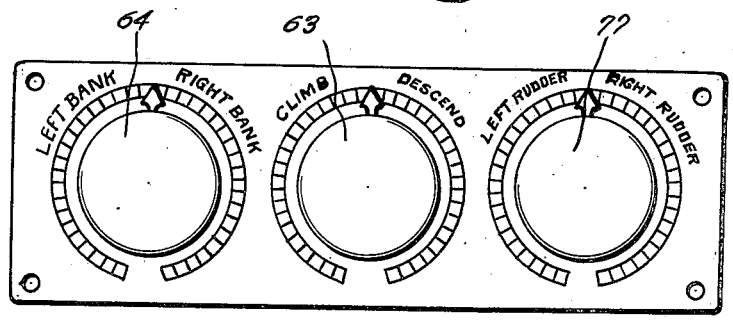
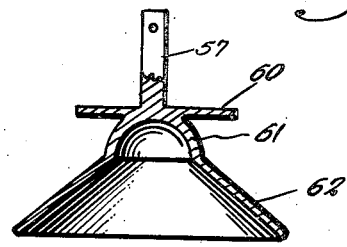
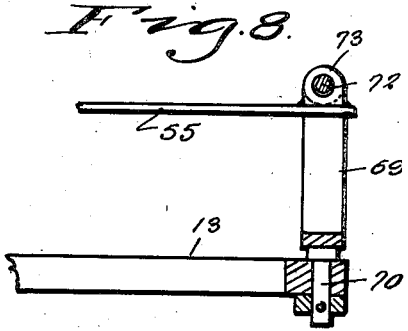
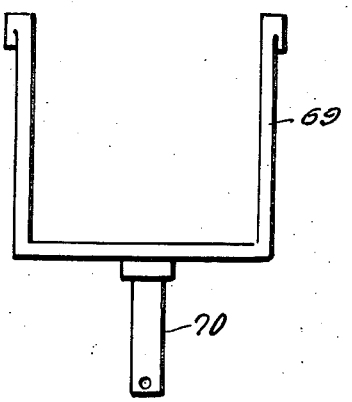
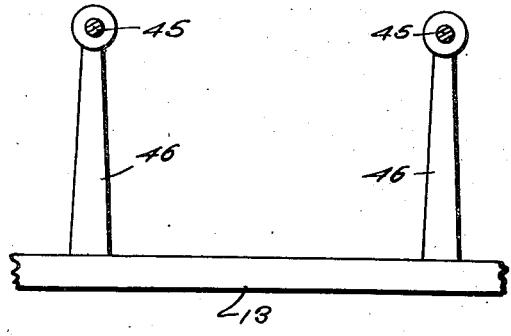
Inventor
Carl E. Jones
By Clarence A. O'Brien
Attorney

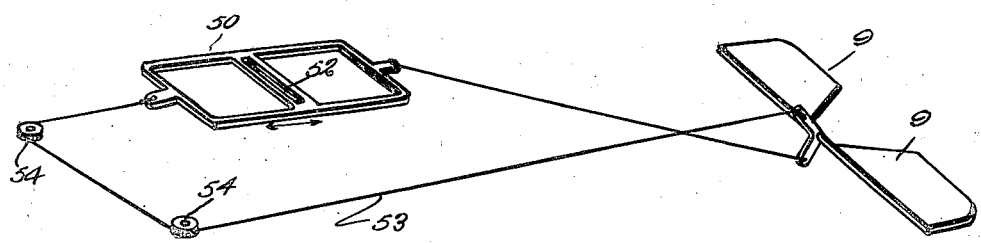
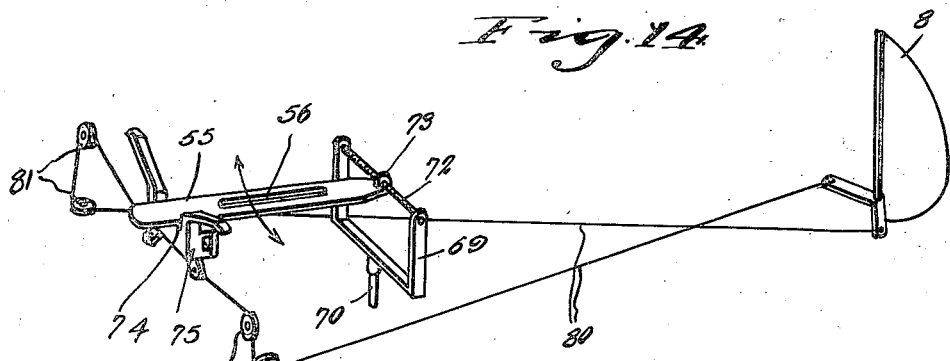
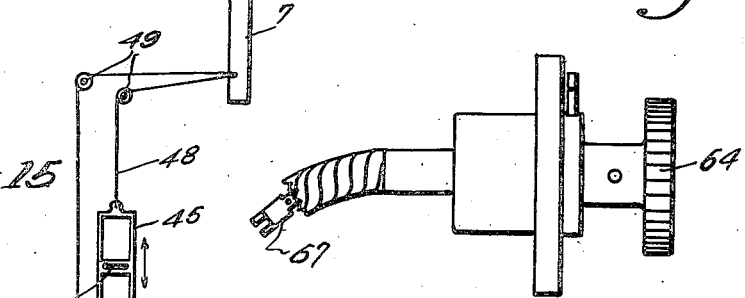
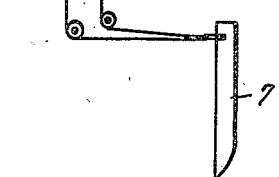

Patented Mar. 23, 1937

2,074,914

UNITED STATES PATENT OFFICE 2,074,914

AEROPLANE CONTROL MECHANISM

Carl E. Jones, Douglas, Ariz.

Application December 17, 1935, Serial No. 54,895

6 Claims. (Cl. 244—80)

This invention relates to aeroplanes and more particularly to a control mechanism therefor.

In accordance with the present invention means is provided for automatically controlling the ailerons, rudder and elevators of an aeroplane to the end that either or all of the aforementioned elements will be manually set, and in the event of the plane being forced out of position by the wind the automatic control mechanism will operate to cause the aeroplane to regain proper position.

The invention together with its objects and advantages will be best understood from a study of the following description taken in connection with the accompanying drawings wherein:

Figure 4 is a detail view taken substantially on the line 4—4 of Figure 2.

Figure 5 is a detail view taken substantially on the line 5—5 of Figure 3.

Figure 6 is a detail view taken substantially on the line 6—6 of Figure 4.

Figure 7 is a sectional view through a socket member and associated parts.

Figure 8 is a detail view showing a yoke and pivot mounting therefor.

Figure 9 is a fragmentary elevational view of a portion of one of the frame members forming part of the invention.

Figure 10 is an elevational view of a yoke member.

Figure 11 is a plan view of a knob equipped panel.

Figure 12 is an end elevational view of the panel.

Figure 13 is a diagrammatic view of the elevators and a control member therefor.

Figure 14 is a diagrammatic view of a rudder and control means associated therewith.

Figure 15 is a diagrammatic view of ailerons and a control member associated therewith and Figure 16 is an elevational view of a slide forming part of the rudder control.

Figure 1:
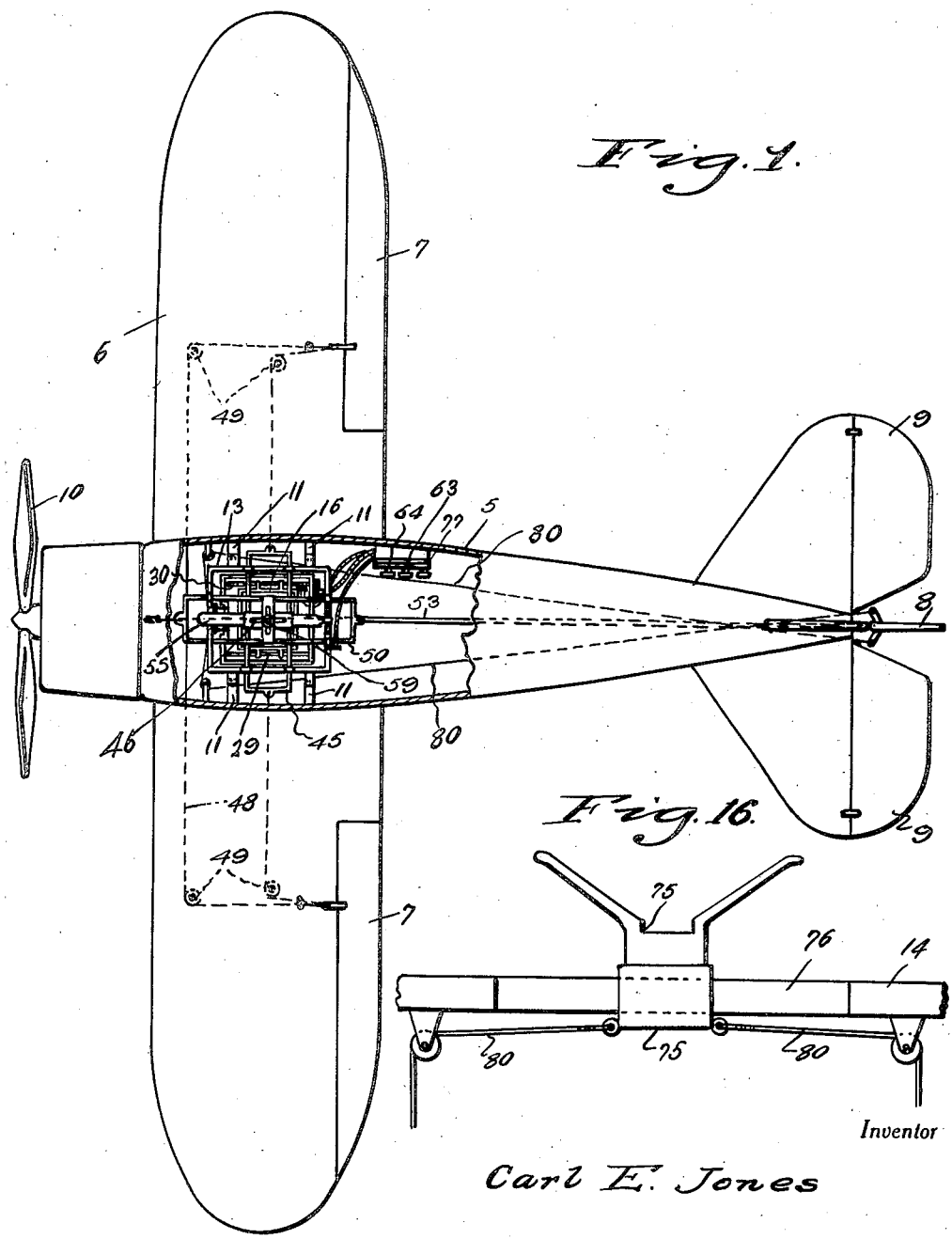
Figure 1 is a top plan view of the mechanism with certain parts of the aeroplane broken away and shown in section.
Figure 2:
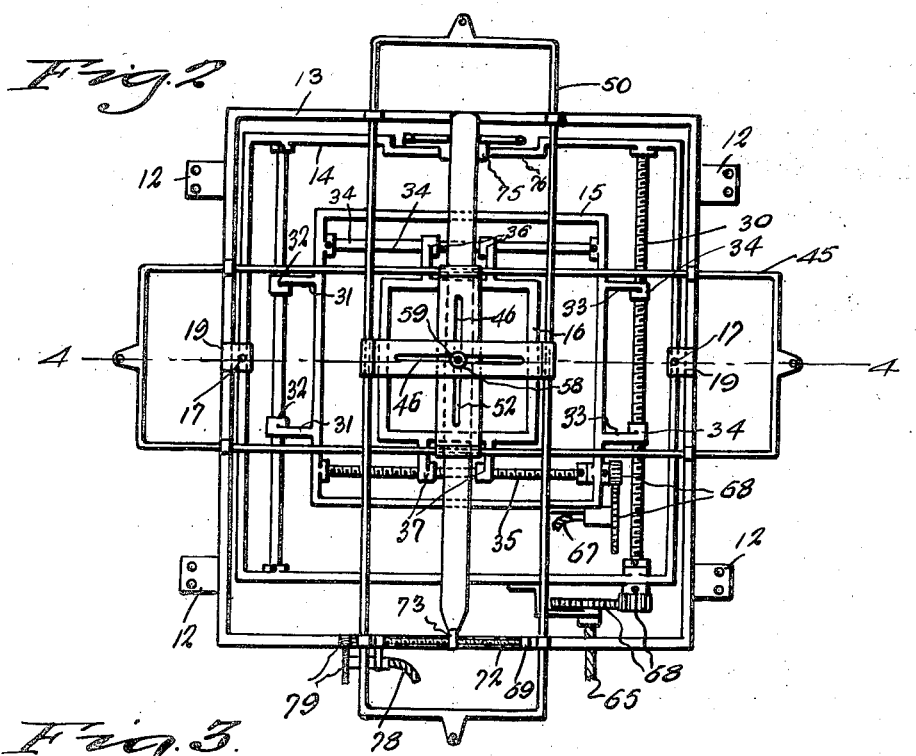
Figure 2 is a top plan view showing an arrangement of frame structures in accordance with the present invention.

Referring to the drawings in detail it will be seen that I have illustrated the invention as applied to a conventional aeroplane which includes among other parts a fuselage 5, sustaining planes or wings 6 equipped with ailerons 7, a rudder 8, elevators 9, and propeller 10.

In accordance with the present invention there is mounted internally of the fuselage 5, and at opposite sides of the fuselage pairs of brackets 11 to which are secured through the medium of attaching flanges 12 and suitable fastening devices such as a bolt or the like a substantially rectangular frame 13.

Adapted to be nested within the frame 13 are smaller frames 14, 15 and 16 respectively.

Lifting rods 17 extend through openings provided in opposite sides of the frame 14 and are provided with collars 18 on which said sides of the frame 14 rest. The rods 17 work through apertured guide plates 19 provided on adjacent sides of the frame 13.

Depending from the fixed frame 13 are hanger bars 20 provided with guide sleeves 21 through which said rods 17 also operate.

For elevating the frame 14 and associated frames 15 and 16 there is suitably journalled in the lower ends of the hanger bars 20 a shaft 22 on which are mounted eccentric disks 23 provided with eccentric straps 24 pivotally connected with the lifting rods 17 as at 25.

For rocking the shaft 22 there is provided a hand lever 26 equipped with a detent structure 27 cooperable with a rack segment 28 suitably mounted at one side of the fuselage 5 for securing the shaft 22 at the desired adjustment.

Figure 3:
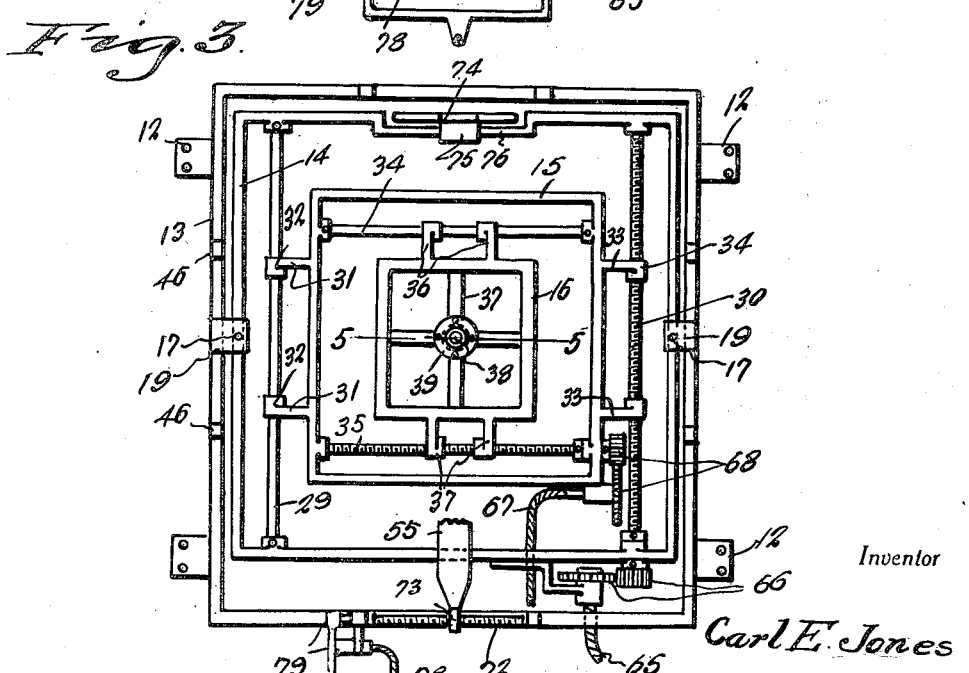
Figure 3 is a view similar to Figure 2 with certain parts removed.

As best shown in Figure 3 suitably mounted within the frame 14 parallel to one side of the frame is a smooth rod 29 while rotatably supported in the frame 14 adjacent to the side thereof farthest remote from the rod 29 is a screw 30.

Frame 15 has projecting from one side thereof arms 31 equipped with integral sleeves 32 receiving the shaft 29. At a relatively opposite side thereof frame 15 is provided with integral arms 33 provided with integral internally threaded sleeves or nuts 34 which receive the screw 30 so that upon rotation of the screw frame 15 will be shifted in either of two directions on a line paralleling the rod 29.

Frame 15 is similarly provided with a rod 34 and a screw 35 while frame 16 is provided at one side thereof with sleeve equipped arms 36 the sleeves of which receive the rod 34. Frame 16 is also provided with arms 37 equipped with integral internally threaded sleeves or nuts threadedly engaged with the aforementioned screw 35 so that upon rotation of said screw frame 16 will be shifted laterally in either of two directions relative to the frame 15, it being noted that frame 16 moves relative to frame 15 in a path at right angles to the movement of the frame 16 relative to the frame 14.

Frame 16 is provided with a spider 37 the hub of which forms a socket 38. A cap 39 for the socket is provided and is secured in position through the medium of screws 40.

Socket 38 and cap 39 accommodate a ball 41 provided intermediate the ends of a pendulum 42 which is equipped at its lower end with a relatively large ball 43 or other suitable weight structure and at its upper end with a relatively small ball 44.

An aileron control slide 45 in the form of an elongated rectangular frame as shown in Figure 15 has opposite side portions thereof slidably accommodated in side standards 46 rising in pairs from opposite sides of the fixed frame 13. Intermediate its ends the control slide 45 is provided with a transverse bar equipped with a slot 47 while at relatively opposite ends thereof the control slide is connected in any suitable manner with the respective opposite end of an aileron operating cable 48 suitably connected with the ailerons 7 and trained over suitably provided sheaves 49 as best shown in Figure 15.

Disposed above and at right angles to the slide 45 is an elevator control slide 50 which is also of rectangular frame structure and has opposite side portions thereof slidably accommodated in guide standards 51 rising in pairs from two opposed sides of the fixed frame 13. Slide 50 intermediate its ends is provided with a transverse bar equipped with a slot 52 as shown in Figure 13. Also at its respective opposite ends, and as clearly shown in Figure 13 slide 50 is connected with elevator operating cable 53 suitably connected with the elevators and trained over suitably arranged pulleys 54.

Disposed beneath the slide 45 and also extending at right angles to the slide is a rudder control slide 55 provided with a longitudinally extending slot 56.

Extending through the slots 56, 47 and 52 is a pin 57 held against vertical movement downwardly through said slots through the medium of a washer 58 and pin 59 as best shown in Figure 4. Adjacent its lower end the pin 57 is provided with a flange or collar 60 which forms a rest for the slide 55 and below the collar or flange 60 said pin 57 is formed integral with a socket 61 provided with an integral flaring or frusto-conical skirt 62 as best shown in Figure 7.

As shown in Figure 4 with frames 14, 15 and 16 in elevated position, which is the position shown in Figure 4 ball 44 is accommodated within the socket 61 in a manner to transmit swinging movement of the pendulum 42 to either or all of the slides 45, 55 and 50 so will hereinafter be made more manifest.

For manually and independently shifting the frames 14 and 15 there are provided for the respective frames operating buttons 63 and 64 respectively and movement is transmitted from the elevator control button 63 to the screw 30 for shifting the frame 14 which in turn controls the shifting movement of the slide 50 through the medium of a flexible shaft 65 and gearing 66 which is suitably mounted and connects the shaft 65 with the screw 30; while movement of the button 64 for controlling the ailerons 7 is transmitted to the screw 35 for operating or sliding the frame 16 which in turn controls sliding movement of the slide 45 through the medium of a flexible shaft 67 and gearing 68 which connects shaft 67 with the screw 35.

For manually operating the rudder control slide 55 there is provided a yoke member 69 fixedly mounted on one end of a pin 70 which is pivoted in one side of the fixed frame 13 as at 71 and as clearly shown in Figure 8. Supported between the sides of the yoke 69 is a screw 72 with which is threadedly engaged an integral nut or internally threaded sleeve 73 provided on one end of the slide 55.

At its free end the slide 55 engages a suitable seat 74 provided therefor on a carriage 75 which is slidably supported on a rail portion 76 of frame 14 and as best shown in Figures 3 and 16.

For the rudder 8 there is provided a control button 77 which is connected with the screw 72 through the medium of a flexible shaft 78 and gearing 79.

Carriage 75 is connected with the aileron control cables 80 which are connected with the rudder 8 and trained over suitably arranged pulleys 81 in a manner clearly suggested in Figure 14.

The operation, utility and advantages of the invention will be best understood from the following:

When it is desired, for example, to either climb or descend button 63 is rotated in the proper direction as will be clear from a study of said Figure 11. Movement of the button 63 is transmitted through the flexible cable 65 gearing 66 and screw 30 to move the frame 15 fore or aft as the case may be. The movement of the frame 15 in the proper direction is transmitted to the elevator control slide 50 by reason of the engagement of pin 57 with one longitudinal side of slot 52. The shifting of the slide 50 in the proper direction will obviously cause a raising or lowering of the elevators 9 and will cause the aeroplane to climb or descend as the case may be.

As is thought to be apparent, should, when climbing or descending the aeroplane be nosed out of position by a strong gust of wind movement of the stabilizer pendulum will be transmitted through the medium of the ball and socket connection 44 and 61 to the pin 57 and in turn by reason of the pin engaging in the slot 52 of slide 50 the movement of the pendulum will be transmitted to the slide 50 to automatically properly position the elevators 9 thus enabling the aeroplane to gain its proper stability or equilibrium.

Likewise if it is desired to bank the aeroplane to the right or left knob 64 is turned in the proper direction and movement of the knob is transmitted through the flexible cable or shafting 67 and gearing 68 to the screw 35 for shifting the frame 16 to the right or left as the case may be. Movement of the frame 16 is transmitted through the pendulum connection including pin 57 engaging in the slot 47 of slide 45 to the slide for moving the latter in a direction corresponding to the movement of the frame 16 to raise or lower the ailerons 7 as the case may be to effect the desired banking. Likewise if, during this "banking" of the aeroplane the latter be thrown off its course so as to lose its equilibrium pendulum 42 will operate through the medium just described to return the slide 45 and thus permit the aeroplane to regain its stability or equilibrium.

Also for swinging the rudder 8 either to the right or left knob 77 is turned in the proper direction and movement of the knob 77 is transmitted through the flexible shafting 78 and the gearing 79 to the screw 72. This will result in causing the slide 55 to rotate about the pin 57 as a pivot and this rotative movement of the slide 55 is transmitted to the carriage 75 for causing the latter to move either to the right or left as the case may be; movement of the carriage being transmitted through the cables 80 to the rudder 8 for swinging the latter in the proper direction.

In this connection it will be also understood that if for any reason the aeroplane should lose its equilibrium the stabilizer pendulum 42 will be caused to swing and movement of the pendulum will be transmitted to the slide 55 through the medium of the pin 57 operating in the slot 56 of said slide to cause the latter to swing back to proper position and thereby return the rudder 8 to its proper position causing the aeroplane to regain its stability or equilibrium.

When it is not desired to use the automatic control mechanism shaft 22 is rocked by a proper manipulation of lever 26 and the movement of the shaft 22 is transmitted to the rods 17 through the eccentrics and the connections between said eccentrics and the rods 17 causing the latter to move downwardly. Manifestly frame 14 and associated parts will move downwardly with the rods 17 thus causing ball 44 to move out of socket 61 whereby the slides are now free of any connection with the pendulum 42.

With the frame 14 and associated parts in this lowered position control of the aeroplane will be taken care of by the pilot through the medium of the usual or ordinary hand-control mechanism with which, it is to be understood, the aeroplane will be equipped in addition to the mechanism constituting the subject matter of this invention.

It is thought that a clear understanding of the construction, utility and advantages of an invention of this character will be had from the foregoing.

Having thus described the invention, what is claimed as new is:

1. In an aeroplane, the combination with the rudder, elevators and ailerons of the aeroplane, of independent means connected with said rudder, elevators and ailerons respectively for manually setting the respective elements, a stabilizer device, and an operating connection between said stabilizer and the rudder, elevator and aileron setting devices for independently and simultaneously operating said devices for returning the rudder, elevators and ailerons to their respective normal positions.

2. An aeroplane having in combination a fuselage, rudder, elevators, sustaining planes and ailerons associated with said sustaining planes; a frame structure fixedly mounted within said fuselage, a second frame mounted within the first frame and adapted to move downwardly in a vertical plane with respect to the first frame, guiding and supporting means for the second frame, independent control means for said rudder, elevators and ailerons respectively, a stabilizing pendulum, means suspending the stabilizing pendulum from the second frame, means common to said rudder, elevators and aileron control means respectively for transmitting movement of the pendulum to each of said control means, when the second frame is in a raised position, and for placing said stabilizing-pendulum out of operative connection with said control means when the second frame is in a lowered position, and means for raising and lowering said second frame.

3. An aeroplane having in combination a fuselage, a frame fixedly mounted in said fuselage, a second frame, said second frame being movable from a position in a plane below the first frame upwardly to a position within the confines of the first frame, guide means for the second frame, means for raising and lowering said second frame, a carriage mounted on one side of said second frame to move therealong, a yoke pivotally mounted on the first frame at the side thereof farthest remote from said carriage, a screw carried by said yoke, a slide member having an end seating in said carriage and provided at a relatively opposite end with an integral threaded nut engaging said screw whereby rotation of said screw is transmitted to said carriage for sliding the latter in either of two directions, a rudder, an operating connection between said rudder and said carriage, means for rotating said screw.

4. An aeroplane having in combination a fuselage, a frame fixedly mounted in said fuselage, a second frame, said second frame being movable from a position in a plan below the first frame upwardly to a position within the confines of the first frame, guide means for the second frame, means for raising and lowering said second frame, a carriage mounted on one side of said second frame to move therealong, a yoke pivotally mounted on the first frame at the side thereof farthest remote from said carriage, a screw carried by said yoke, a slide member having an end seating in said carriage and provided at a relatively opposite end with an integral threaded nut engaging said screw whereby rotation of said screw is transmitted to said carriage for sliding the latter in either of two directions, a rudder, an operating connection between said rudder and said carriage, means for rotating said screw; a third frame mounted within said second frame, means for supporting the third frame for sliding movement in either of two directions within the second frame, mechanism connected with the third frame for sliding the latter, a slide member supported above said first frame for movement relative thereto in a direction corresponding to the direction of movement of the third frame, elevators mounted on the aeroplane, an operating connection between said slide and said elevators for transmitting movement of the slide to the elevators, and means for transmitting movement of the said third frame to said slide.

5. An aeroplane having in combination, a fuselage, a frame fixedly mounted in said fuselage, a second frame, said second frame being movable from a position in a plane below the first frame upwardly to a position within the confines of the first frame, guide means for the second frame, means for raising and lowering said second frame, a carriage mounted on one side of said second frame to move therealong, a yoke pivotally mounted on the first frame at the side thereof farthest remote from said carriage, a screw carried by said yoke, a slide member having an end seating in said carriage and provided at a relatively opposite end with an integral threaded nut engaging said screw whereby rotation of said screw is transmitted to said carriage for sliding the latter in either of two directions, a rudder, an operating connection between said rudder and said carriage, means for rotating said screw; a third frame mounted within said second frame, means for supporting the third frame for sliding movement in either of two directions within the second frame, mechanism connected with the third frame for sliding the latter, a second slide member supported above said first frame for movement relative thereto in a direction corresponding to the direction of movement of the third frame, elevators mounted on the aeroplane, an operating connection between said slide and said elevators for transmitting movement of the said third frame to said slide, a fourth frame mounted within said third frame, means supporting the fourth frame within the third frame for sliding movement relative to the third frame and in either of two directions at right angles to the direction of movement of the third frame and including means for shifting the fourth frame relative to the third frame, a third slide mounted above the second slide, ailerons, an operating connection between the third slide and said ailerons, and motion transmitting means connecting the fourth frame with the third slide for shifting the latter.

6. An aeroplane having in combination, a fuselage, a frame fixedly mounted in said fuselage, a second frame, said second frame being movable from a position in a plane below the first frame upwardly to a position within the confines of the first frame, guide means for the second frame, means for raising and lowering said second frame, a carriage mounted on one side of said second frame to move therealong, a yoke pivotally mounted on the first frame at the side thereof farthest remote from said carriage, a screw carried by said yoke, a slide member having an end seating in said carriage and provided at a relatively opposite end with an integral threaded nut engaging said screw whereby rotation of said screw is transmitted to said carriage for sliding the latter in either of two directions, a rudder, an operating connection between said rudder and said carriage, means for rotating said screw; a third frame mounted within said second frame, means for supporting the third frame for sliding movement in either of two directions within the second frame, mechanism connected with the third frame for sliding the latter, a second slide member supported above said first frame for movement relative thereto in a direction corresponding to the direction of movement of the third frame, elevators mounted on the aeroplane, an operating connection between said second slide and said elevators for transmitting movement of the second slide to the elevators, and means for transmitting movement of the said third frame to said second slide, a fourth frame mounted within said third frame, means supporting the fourth frame within the third frame for sliding movement relative to the third frame and in either of two directions at right angles to the direction of movement of the third frame and including means for shifting the fourth frame relative to the third frame, a third slide mounted above the first frame, ailerons, an operating connection between the third slide and said ailerons, and motion transmitting means connecting the fourth frame with the third slide for shifting the latter, and stabilizing means connected with said frames and said slides for moving said slides simultaneously and/or independently of one another as and for the purpose specified.

CARL E. JONES.